Nov. 26, 1968  L. B. MILNER ET AL  3,412,902
MILK BLENDING AND DISPENSING DEVICE
Filed May 29, 1967
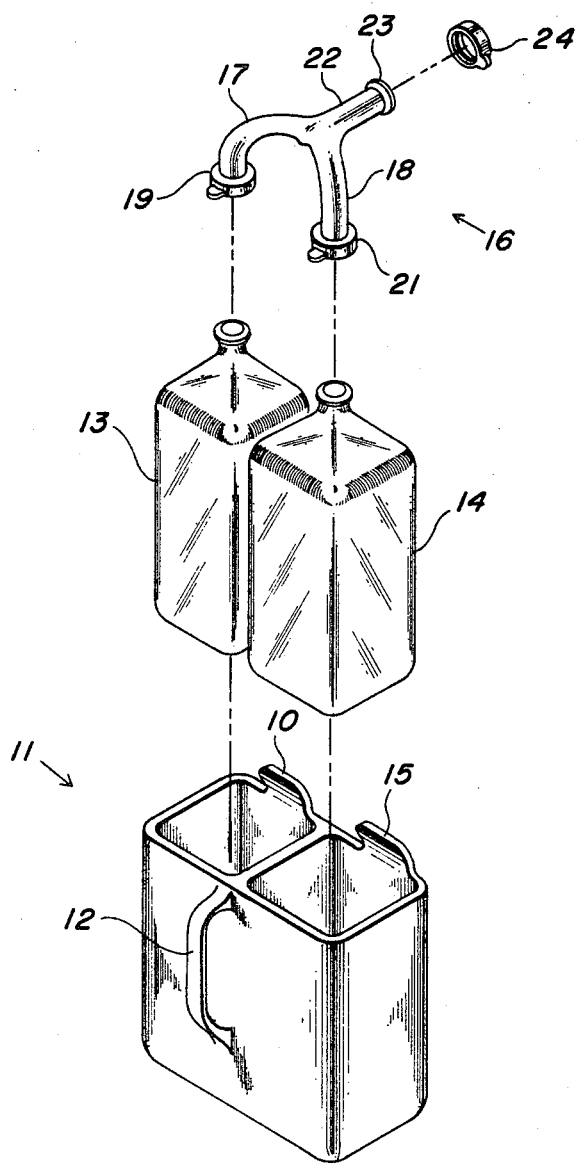
INVENTORS
LOUIS B. MILNER
KENNETH C. SMITH
HARRY (NMI) WRIGHT
Richard K. MacNeill United States Patent Office 3,412,902
Patented Nov. 26, 1968

3,412,902
MILK BLENDING AND DISPENSING DEVICE
Louis B. Milner, San Diego, Kenneth C. Smith, Lemon Grove, and Harry Wright, San Diego, Calif., assignors to Economyx Division of Wright Industries, La Mesa, California
Filed May 29, 1967, Ser. No. 641,969
1 Claim. (Cl. 222—143)

ABSTRACT OF THE DISCLOSURE

A milk blending and dispensing device consisting of a container dimensioned for snugly receiving two milk bottles in a combination with a blending spout having two channels, each of said channels coupled to the top of a different milk bottle, the two channels being blended or joined into one common spout for simultaneously blending and dispensing the contents of the two milk bottles.

*Background of the invention*

The present invention relates to a blending and dispensing device and more particularly to a milk blending and dispensing device for simultaneously blending and dispensing the contents of two separate milk bottles.

A milk pricing paradox exists in many areas of the United States today in that the average price of skim milk and whole milk is cheaper than the price of low fat milk which is approximately the same butter fat content as the average of skim milk and whole milk. In these areas, economy-minded people often buy skim milk and whole milk to blend themselves and enjoy the advantages of low fat milk at the lower price average of skim milk and whole milk. The blending process and storage of the blended milk is, of course, inconvenient at best, and where the blended mix is stored, it must be covered to prevent excessive bacteria formation.

According to the invention, a holder is provided, preferably constructed of a semi-resilient plastic for the snug reception of two containers, one containing whole milk and the other containing skim milk. The holder is equipped with a handle on one side and restraining means on the other for securing the two containers. A pouring and blending spout is provided having two passages terminating in means for snugly receiving the tops of the two milk bottles. The other ends of the two channels are combined in a spout for the blending and simultaneous pouring from the two milk bottles. A cap can be provided over the pouring spout between uses for eliminating any contact with the air of the liquid within the containers.

An object of the present invention is the provision of a blending and dispensing device for simultaneously blending and dispensing milk from two separate containers.

Another object is to provide a liquid blending and dispensing device which is extremely convenient to use during blending, dispensing and storage.

Yet another object is the provision of a liquid blending and dispensing device in which containers of the liquids are conveniently and securely held.

A further object of the invention is to provide a blending and dispensing device which is simple and inexpensive to manufacture.

Other objects and many of the attendant advantages of this invention will be readily appreciated as the same becomes better understood by reference to the following detailed description when considered in connection with the accompanying drawing in which the sole figure is an exploded view in perspective of the present invention.

Referring to the drawing, a holder is shown generally at 11 having a handle 12 and restraining extensions 10 and 15. A pair of milk containers 13 and 14 are snugly received therein. A blending and mixing member shown generally at 16 has first and second channels 17 and 18, respectively, terminating in first and second recepticles 19 and 21, respectively, each of which form a sealing fit over the tops of milk bottles 13 and 14, respectively. Branches 17 and 18 come together in a common section 22 terminating in a spout 23. A cap 24 is dimensioned for a snug fit over spout 23.

As can be seen, if holder 11 is constructed of a relatively resilient material such as plastic, it can be dimensioned for receiving milk bottles 13 and 14 snugly therein allowing the entire apparatus to be picked up by handle 12 and tilted with the milk pouring from milk containers 13 and 14 through branches 17 and 18, respectively. The milk will then blend in common portions 22 and be dispensed through spout 23. When it is desired to store, in a refrigerator for example, cap 24 can be placed over nozzle 23 to minimize any bacteria formation from air contact. Restraining extensions 10 and 15 obviate any possibility of containers 13 and 14 falling out of holder 11 when it is tilted for blending and pouring.

It can be seen that bottle 13, for example, could contain skim milk and bottle 14 could contain whole milk, the resultant output being a blend of the two which will result in a mixture having approximately the same butter fat as commercial low fat milk. As pointed out above, since the average cost of skim milk and whole milk is less than the cost of commercially available low fat milk in many areas, a substantial saving is effected, without the necessity of pouring from each bottle separately and mixing prior to consumption.

Naturally, the invention can be utilized for the blending and pouring of the contents of any two containers such as different juices, etc.

Hence, it should be understood that the foregoing disclosure relates to only a preferred embodiment of the invention and that it is intended to cover all changes and modifications of the example herein chosen for the purposes of the disclosure which do not constitute departures from the spirit and scope of the invention.

What is claimed is:
1. A blending and dispensing device for blending and dispensing two fluids comprising:
   resilient holding means dimensioned for holding first and second fluid containers;
   said holding means comprising a rectangular receptacle with a center dividing partition for accommodating said first and second fluid containers and a handle vertically disposed on the outside thereof in proximity with said center dividing partition; vertical extension means on said resilient holding means for restraining said first and second fluid containers when placed therein; and
   a pouring and blending means having first and second tubes adapted for communication with first and second containers, said first and second tubes combining and terminating in a single pouring spout.

References Cited
UNITED STATES PATENTS

| 494,061 | 9/1893 | Day | 222—145 X |
|---|---|---|---|
| 704,105 | 7/1902 | Read | 222—145 |
| 1,238,195 | 8/1917 | Ritz | 222—143 |
| 2,743,846 | 5/1956 | Walker | 222—129 |
| 3,130,875 | 4/1964 | Block | 222—142.3 X |
| 3,161,322 | 12/1964 | Stone | 222—145 |
| 3,241,719 | 3/1966 | Schmaus | 222—145 X |

WALTER SOBIN, *Primary Examiner.*